Sept. 1, 1970  J. T. CARCEL ET AL  3,526,444
LIGHTWEIGHT STABILIZED SUPPORT FOR A HOLOGRAPHIC SYSTEM
Filed Feb. 13, 1967  2 Sheets-Sheet 1
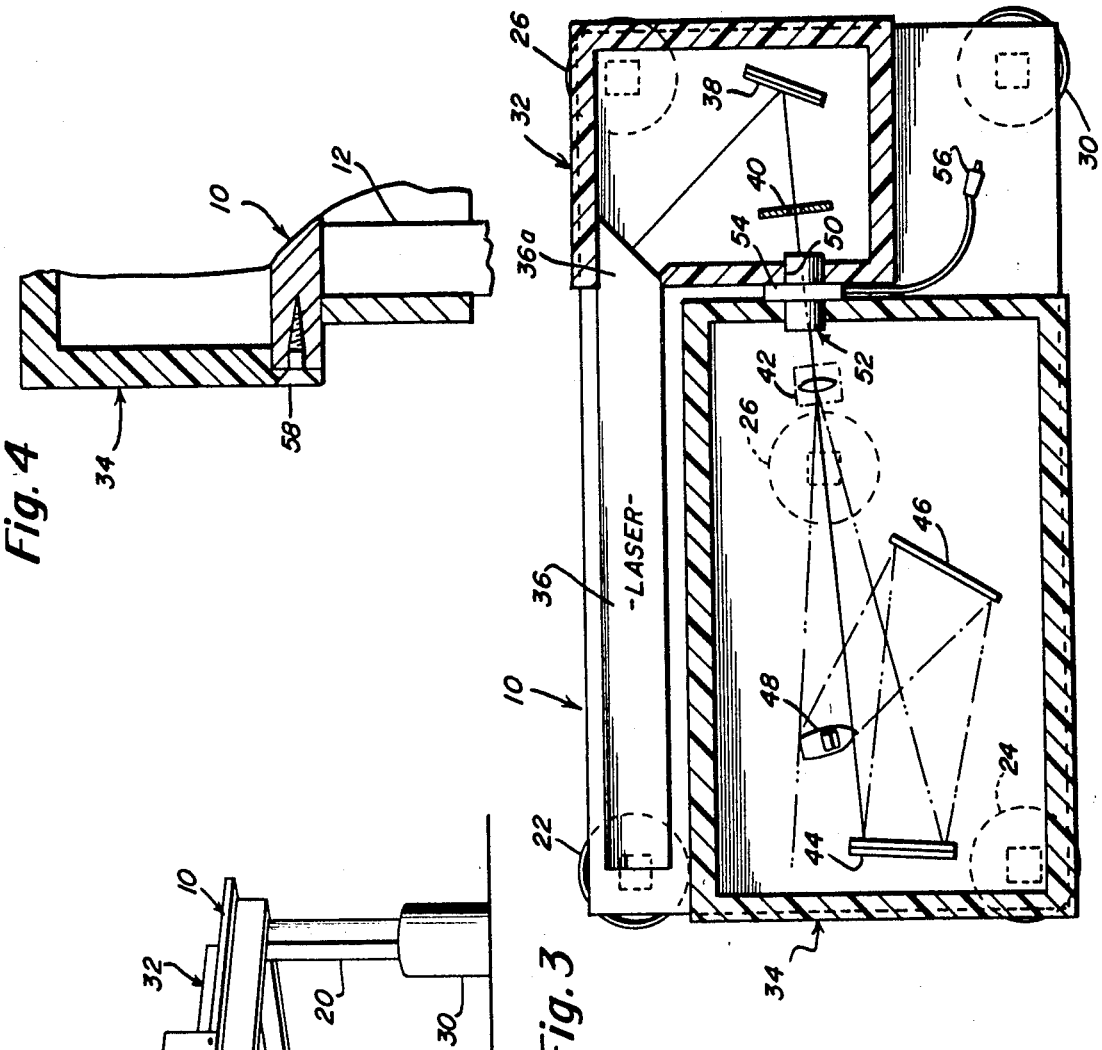
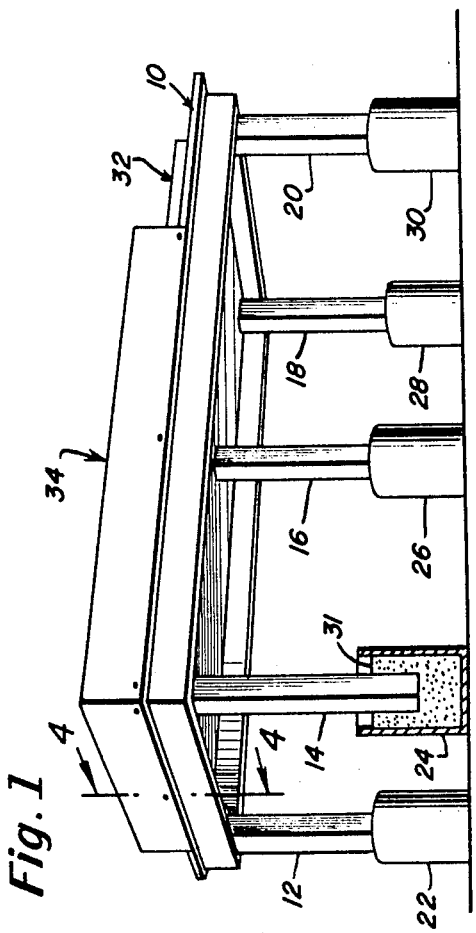
Joseph T. Carcel
Alfred H. Rodemann
INVENTORS
BY
Atty.

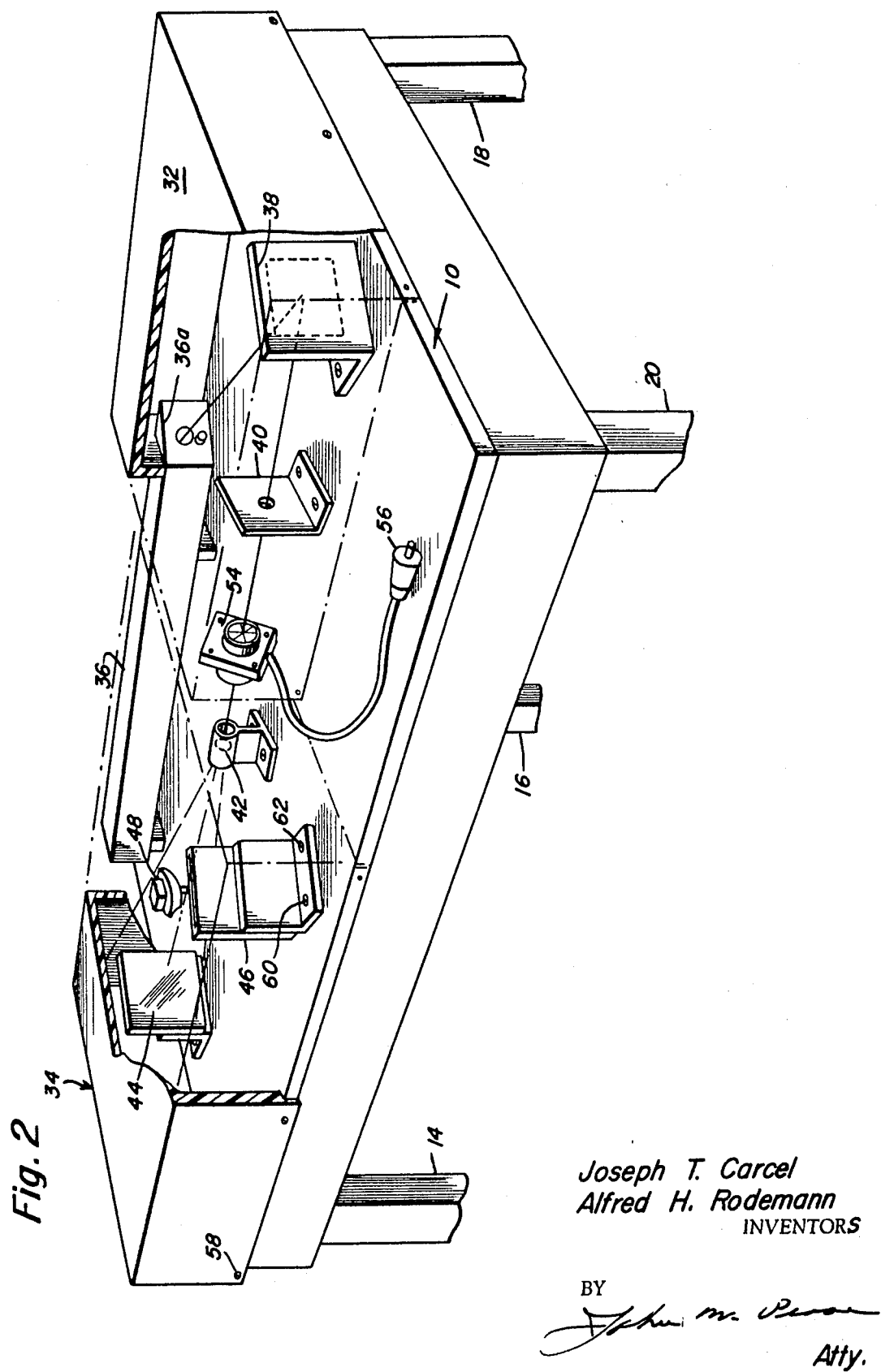

United States Patent Office 3,526,444
Patented Sept. 1, 1970

3,526,444
LIGHTWEIGHT STABILIZED SUPPORT FOR A HOLOGRAPHIC SYSTEM
Joseph T. Carcel, Levittown, and Alfred H. Rodemann, Port Washington, N.Y., assignors to the United States of America as represented by the Secretary of the Navy
Filed Feb. 13, 1967, Ser. No. 616,434
Int. Cl. G02b; F16f 15/00
U.S. Cl. 350—3.5                    1 Claim

ABSTRACT OF THE DISCLOSURE

Apparatus including a support platform for supporting thereon equipment critically sensitive to variation in environmental conditions, depending support means fixed to said platform and floatingly positioned in a quantity of commercially dry sand, and housing means for said equipment to provide a local, clean and stabilized environment, together with the method of testing experimental environment sensitive equipment by inexpensive means before expending funds on elaborate stabilization means.

---

The invention described herein may be manufactured and used by or for the Government of the United States of America for governmental purposes without the payment of any royalties thereon or therefor.

BACKGROUND OF THE INVENTION

Many scientific equipments and processes today have developed to a stage of precision that stringent parameters of operational environment are required. One such process is the holographic process wherein the parameters include extreme limitations on temperature, air turbulence and mechanical vibration. For example, in the holographic process allowable limits of mechanical vibration range in the area of one to four millionths of an inch.

In view of the above mentioned environmental limitations, investigators performing research in fields requiring such limitations in operating conditions are providing expensive, elaborate, time absorbing and bulky environmental stabilization apparatus and methods. For example, researchers in the field of holographic process equipment are using five ton isolated optical benches in subterrain basements. Optical elements and photographic materials are held in rigid fixtures with precision adjustments. Talking, slight movement within the building or running water through the building pipes are avoided in order to obtain satisfactory holograms. Long periods of time up to 24 hours are required to obtain stabilized conditions.

SUMMARY OF INVENTION

In accordance with the subject invention the disadvantages mentioned above are eliminated by the adaption of a simple, inexpensive, isolated experiment support floatingly supported in a volume of commercially dry sand, such that holographic process equipment, for example, can be tested out and changes made in the equipment to reflect the test results without the immediate need for time delays or expensive, elaborate and bulky equipment.

Other objects and advantages will appear from the following description of an example of the invention when considered in connection with the accompanyng drawings, and the novel features will be particularly pointed out in the appended claim.

IN THE DRAWINGS

FIG. 1 is a perspective view from an upward angle of apparatus embodying the invention;

FIG. 2 is a perspective view from a downward angle of the apparatus of FIG. 1 with holographic process equipment thereon and showing, in partially broken away form, housing means for the equipment;

FIG. 3 is a plan view partially in cross-section of the apparatus and equipment shown in FIG. 2; and FIG. 4 is a cross-sectional view taken on the line 4—4 of FIG. 1 of a portion of the housing and platform of FIGS. 1 to 3 showing the means of attaching the same to the platform.

Referring to FIG. 1 of the drawings in accordance with one preferred embodiment of the subject invention a platform 10 having a plurality of depending legs 12, 14, 16, 18 and 20 is floatingly supported in containers 22, 24, 26, 28 and 30 of commercially dry sand indicated at 31.

The equipment to be stabilized, as for example the holographic process equipment, and the object to be reproduced, shown in FIGS. 2 and 3, is mounted on the platform 10 and enclosed in the housings 32 and 34.

As shown in FIGS. 2 and 3, the holographic process equipment includes an energy source having an energy emitting end, an optical system and a recording system. More particularly, the equipment includes a laser 36, mirror 38, aperture plate 40, microscope objective 42, reference beam mirror 44, and photographic plate 46. The object to be reproduced is shown at 48. Housings 32 and 34 are formed with aligned apertures 50 and 52 to pass the reflected laser beam and the housings are spaced to accommodate therebetween shutter mechanism 54 manually controlled by shutter control actuator 56. The emitter end 36a of the laser 36 is enclosed in the housing 32 and the entire laser beam path, from the laser to the photographic plate, and all elements in between are completely enclosed in Styrofoam or other suitable material to reduce heat transfer and air turbulence. The enclosure housing 34 provides the additional function of being light tight for stray light isolation. The housings 32 and 34 are fixed to the platform by screws or other suitable means as indicated by screw 58 in FIG. 4. The various elements defining the laser beam paths may be mounted by simple screw means shown at 60 and 62, for example, in FIG. 2. Rigid precision optical mounts are not required.

It has been found that with apparatus as above described, mechanical vibrations can be limited to a sufficient degree to provide satisfactory holographs. This result now makes it possible to test holographic process equipment with inexpensive set up equipment and with minimum time delay. The basic principle, while particularly useful for holographic process equipment, is also useful with any equipment requiring such exactitude of mechanical vibration limitation.

It will be understood that various changes in the details, materials, and arrangements of parts and steps, which have been herein described or illustrated in order to explain the nature of the invention may be made by those skilled in the art within the principle and scope of the invention as expressed in the appended claim.

We claim:
1. An apparatus for producing holographs the combination comprising
  (a) an object to be reproduced and holographic process equipment including an energy source having an energy emitting end, an optical system and a recording system;
  (b) platform means for supporting thereon said object and equipment;
  (c) at least three legs fixed to said platform to support the same; and
  (d) a quantity of commercially dry loosely stacked sand;
  (e) open ended container means dividing said sand into separate masses, one for each of said legs;
  (f) said leg means being floatingly positioned in said sand to isolate said apparatus from outside sources of vibration.

References Cited

UNITED STATES PATENTS

| | | | |
|---|---|---|---|
| 1,069,693 | 8/1913 | Hay | 248—22 |
| 3,348,795 | 10/1967 | Schilling | 188—101 |

OTHER REFERENCES

Pennington, "How To Make Laser Holograms," Microwaves, pp. 36, 37, October 1965.

Rogers, "Experiments in Diffraction Microscopy," Royal Society of Edinburgh Proceedings Sect. A, vol. 63, p. 205, 1950–1951.

DAVID SCHONBERG, Primary Examiner

R. L. SHERMAN, Assistant Examiner

U.S. Cl. X.R.

248—20